(12) United States Patent
Houston et al.

(10) Patent No.: US 11,418,118 B1
(45) Date of Patent: Aug. 16, 2022

(54) REGULATION LOOP CONTROL FOR VOLTAGE REGULATION IN A SWITCH MODE POWER SUPPLY

(71) Applicant: Renesas Electronics America Inc., Milpitas, CA (US)

(72) Inventors: Michael Jason Houston, Cary, NC (US); Allan Warrington, Kent (GB)

(73) Assignee: RENESAS ELECTRONICS AMERICA INC., Milpitas, CA (US)

( * ) Notice: Subject to any disclaimer, the term of this patent is extended or adjusted under 35 U.S.C. 154(b) by 7 days.

(21) Appl. No.: 16/785,209

(22) Filed: Feb. 7, 2020

Related U.S. Application Data

(60) Provisional application No. 62/803,385, filed on Feb. 8, 2019.

(51) Int. Cl.
*H02M 3/158* (2006.01)
*H02M 1/00* (2006.01)

(52) U.S. Cl.
CPC ....... *H02M 3/1582* (2013.01); *H02M 1/0003* (2021.05)

(58) Field of Classification Search
CPC ......... H02M 3/158; H02M 2001/0025; H02M 2001/0009; H02M 1/08; H02M 3/156; H02M 3/159; H02M 3/1582; H02M 3/1588; H02M 2003/1566; H02M 1/003
See application file for complete search history.

(56) References Cited

U.S. PATENT DOCUMENTS

| | | | |
|---|---|---|---|
| 5,402,060 A * | 3/1995 | Erisman | H02M 3/1582 323/344 |
| 8,710,810 B1 | 4/2014 | McJimsey et al. | |
| 9,413,242 B2 | 8/2016 | Arno | |
| 10,135,340 B1 * | 11/2018 | Megaw | H02M 3/1582 |
| 2009/0115392 A1 | 5/2009 | Shimizu | |
| 2009/0153118 A1 | 6/2009 | Sato et al. | |
| 2012/0038334 A1 | 2/2012 | Peng et al. | |
| 2012/0139500 A1 * | 6/2012 | Ye | H02M 1/10 320/135 |
| 2012/0153915 A1 * | 6/2012 | Loikkanen | G05F 1/618 323/283 |
| 2012/0299568 A1 * | 11/2012 | Kumagai | H02M 3/1582 323/282 |
| 2013/0200864 A1 * | 8/2013 | Huang | H02M 3/156 323/271 |
| 2014/0084883 A1 | 3/2014 | Tanabe | |
| 2014/0320104 A1 * | 10/2014 | Guo | H02M 3/158 323/290 |
| 2015/0069957 A1 * | 3/2015 | Chang | H02J 7/007 320/107 |
| 2015/0194880 A1 | 7/2015 | Wibben | |

(Continued)

*Primary Examiner* — Gustavo A Rosario-Benitez
(74) *Attorney, Agent, or Firm* — Foley & Lardner LLP

(57) ABSTRACT

One or more embodiments relate to a regulation loop control circuit for regulation of a parameter such as an input voltage or output voltage for a buck-boost converter. In these and other embodiments, the regulation loop control circuit is configured to select between an input voltage loop for regulation of the input voltage or an output voltage loop for regulation of the output voltage in response to an input voltage error, an output voltage error, and a threshold detector to protect the converter without sacrificing output voltage regulation and transient response.

17 Claims, 7 Drawing Sheets

(56) References Cited

U.S. PATENT DOCUMENTS

| | | | |
|---|---|---|---|
| 2015/0372613 A1* | 12/2015 | Houston | H02M 7/04 |
| | | | 307/31 |
| 2016/0246316 A1* | 8/2016 | Lim | H02J 1/00 |
| 2016/0254689 A1* | 9/2016 | Lee | H02J 7/00 |
| | | | 320/107 |
| 2016/0352128 A1* | 12/2016 | Houston | H02M 3/156 |
| 2017/0077817 A1 | 3/2017 | Houston | |
| 2017/0194858 A1* | 7/2017 | Villot | H02M 1/32 |
| 2019/0120905 A1* | 4/2019 | Wong | H02J 7/04 |
| 2019/0305688 A1* | 10/2019 | Seymour | H02M 1/42 |
| 2019/0356226 A1* | 11/2019 | Lin | H02M 3/1582 |
| 2020/0006953 A1 | 1/2020 | Luo et al. | |
| 2020/0099301 A1 | 3/2020 | Itou | |
| 2020/0228013 A1 | 7/2020 | Chao | |
| 2020/0228018 A1 | 7/2020 | Wiktor et al. | |

\* cited by examiner

REGULATION LOOP CONTROL FOR VOLTAGE REGULATION IN A SWITCH MODE POWER SUPPLY

CROSS-REFERENCE TO RELATED PATENT APPLICATIONS

This application claims priority from U.S. Provisional Application No. 62/803,385, filed Feb. 8, 2019, the contents of which are incorporated herein by reference in their entirety.

TECHNICAL FIELD

The present embodiments relate generally to power management and power electronics.

BACKGROUND

Switch mode power converters are widely used in various power applications. Some such power converters, especially buck-boost converters, operate in various modes including various power stage configurations. These buck-boost power converters are required to automatically change modes between buck, boost, or buck-boost during operation while input/output voltage and loading conditions change. Additionally, in any of these modes, parameters such as input voltage, input current, output voltage, or output current need to be tightly regulated using various regulation loops. Designing circuits for prioritizing the regulation loops and switching between a particular regulation loop for regulation of a particular parameter can be challenging.

SUMMARY

One or more embodiments relate to a regulation loop control circuit for transitioning between regulation of a parameter such as an input voltage or output voltage for a buck-boost converter. In these and other embodiments, the regulation loop control circuit is configured to select between an input voltage loop for regulation of the input voltage or an output voltage loop for regulation of the output voltage in response to an input voltage error, an output voltage error, and a threshold detector to protect the converter without sacrificing output voltage regulation and transient response.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

Figure 1:
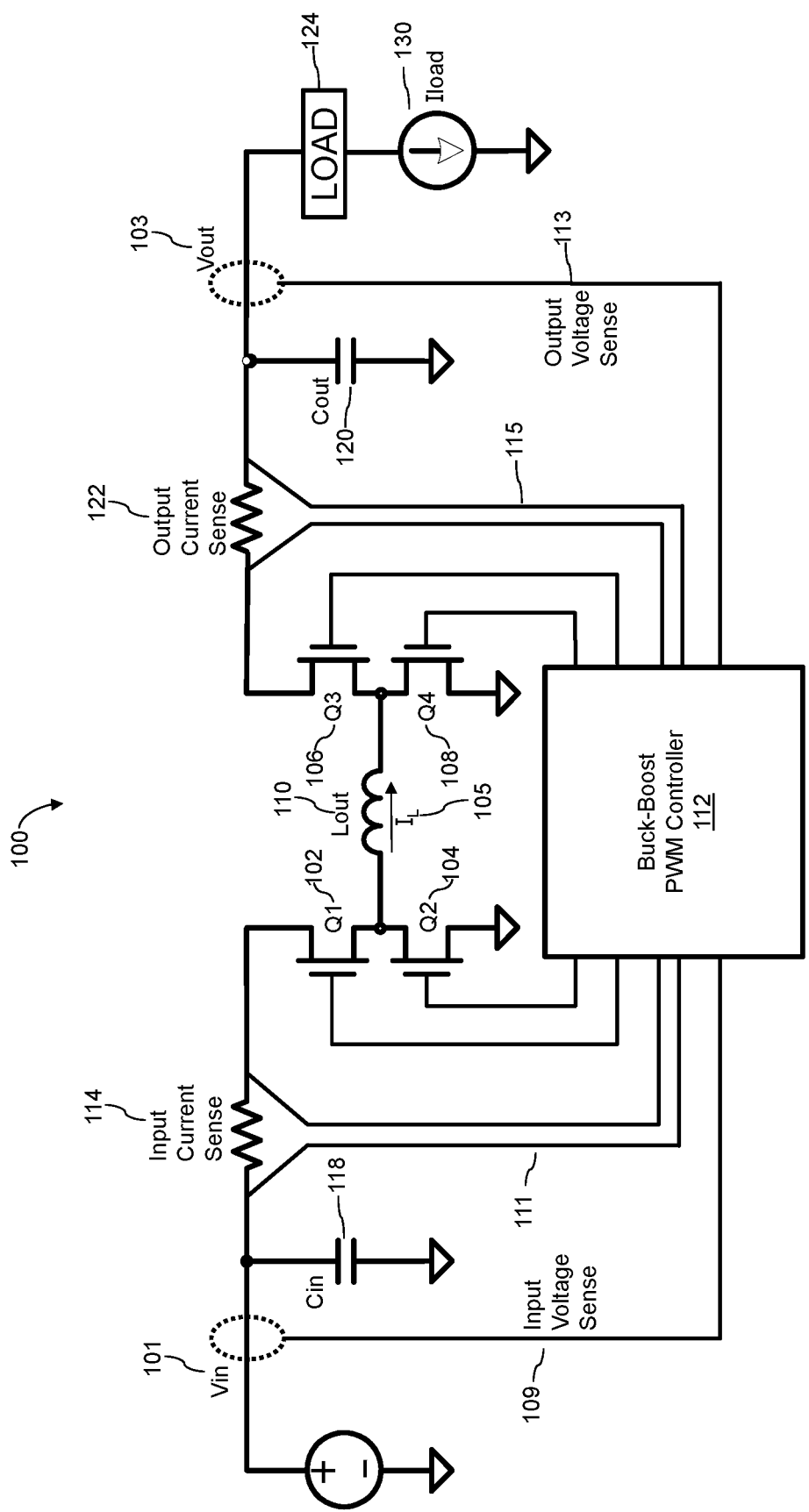
FIG. 1 is a diagram illustrating a standard configuration 100 of a buck-boost power converter.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain aspects, the present Applicant recognizes that buck-boost regulators typically operate in different modes including a buck mode, a buck-boost mode, or a boost mode. As it is well known in the art, in the buck mode the output voltage is typically equal to or lower than the input voltage and in the boost mode the output voltage is typically equal to or higher than the input voltage. Buck-boost converters are typically configured to automatically change modes during operation while the input/output voltage and load conditions are changing.

In each of these modes, one or more parameters including input current, input voltage, output current, or output voltage need to be regulated using dedicated regulation loops, hereafter, loops. For example, an input voltage loop may be used to provide regulation of the input voltage an input current loop may be used to provide regulation of the input current, an output voltage loop may be used to provide regulation of the output voltage, and output current loop may be used to provide regulation of the output current, depending on various load conditions. Applicant further recognizes that it is especially crucial to select a particular loop at proper times otherwise the regulation of certain parameters such as output voltage and the transient response may be hampered as described in more detail below.

A buck-boost regulator typically includes a PWM controller that controls the various switching transistors in all the three modes via one or more PWM signals. This is usually implemented using an error amplifier which compares a feedback of a regulated parameter sensed via a parameter sensing circuit to a reference parameter, and generates an error signal which modulates the PWM signal(s). For example the controller may include an error amplifier coupled to receive the output voltage via an output voltage sense circuit such as an optocoupler. Some other examples of parameters include output current sensed via an output current sense circuit, an input voltage sensed via an input voltage sense circuit, or an input current sensed via an input current sense circuit. Among these, the most commonly used parameters are output voltage and input voltage. When a buck-boost power converter is operating stably in a particular mode, then the PWM controller may be configured to handle a maximum range of error in the regulated parameter as decided by the design. The controller is configured to constantly sense the specific parameter and reduce the error as much as possible by adjusting the frequency and/or pulse width of the PWM signal.

In case of a buck-boost converter having many control loops, each control loop may include a separate error amplifier which generates an error signal based of the difference between a reference parameter and a sensed parameter which is being regulated. For example, an output voltage control loop that is implemented to regulate the output voltage, may comprise an output voltage error amplifier coupled to generate an output voltage error signal proportional to the difference between a reference output voltage and a sensed output voltage. Similarly, an input voltage control loop that is implemented to regulate the input voltage, may comprise an input error amplifier coupled to generate an input voltage error signal proportional to the difference between a reference input voltage and a sensed input voltage.

Furthermore, in typical implementation, the output voltage error and the input voltage error may be compared and when one falls below the other, a particular control loop may be selected or given priority over the other. For example, when the output voltage error falls below the input voltage error, the input voltage control loop may take control. However, this implementation is not reliable and can be problematic, for example because during heavy load transients, the output voltage can fall quickly making the output voltage error also fall quickly. If it falls below the input voltage error then it can make the input voltage control loop take control while the input voltage is still well above its reference. As may be appreciated by those skilled in the art that this can cause the output voltage transient response and performance of the system to exceed system limits.

Embodiments of the present disclosure relate to a method and an apparatus for a regulation loop control circuit for switching between regulation of a parameter such as an input voltage or output voltage for a buck-boost converter. In one embodiment, the regulation loop control circuit is configured to select an input voltage loop for regulation of the input voltage or an output voltage loop for regulation of the output voltage in response to an input voltage error, an output voltage error, and a threshold detector to protect the converter without sacrificing output voltage regulation and transient response.

In one example, the disclosed regulation loop control circuit is configured to prevent the input voltage loop from taking control until close to its reference input voltage even if the output voltage error falls below the input error. As such, the output voltage performance can be improved over a wider input voltage range.

FIG. 1 is a diagram illustrating a configuration of a buck-boost converter 100 including an input voltage supply 101, transistors Q1 102, Q2 104, Q3 106, and Q4 108, an inductor Lout 110, a buck-boost PWM controller 112, input capacitor Cin 118, output capacitor Cout 120, an input current sense resistor R1 114, an output current sense resistor R2 122, and a load 124.

The converter 100 is coupled to receive an input voltage Vin 103 from the voltage supply 101 and coupled to provide a regulated output voltage Vout and a regulated output current Iload 130 to a load. The switching of transistors Q1 102, Q2 104, Q3 106, and Q4 108 is controlled by the buck-boost PWM controller 112. An inductor current IL 105 may pass through the inductor Lout 110 in response to the switching of the transistors. The controller 112 is coupled to receive an input voltage sense signal 109, an input current sense signal 111, an output voltage sense signal 113, and an output current sense signal 115. As may be appreciated by those skilled in the art, the controller 112 may control the turning on and off of the transistors in various ways based on the above mentioned signals. For example, in a typical embodiment, there may be a feedback voltage Vfb generated from the output voltage sense signal 113 which may be compared to a reference voltage Vref (not shown in FIG. 1) and a result of the comparison may be used to control the turning on and off of the transistors to provide the regulated output Vout 107 and current Iload 130.

In general in the converter 100, there can be as many as four control loops including an output voltage control loop, and an output current control loop, an input voltage control loop, and an input current control loop. Any one of four loops can take control and provide regulation of the following signals output voltage, output current, input voltage, or input current.

Figure 2:
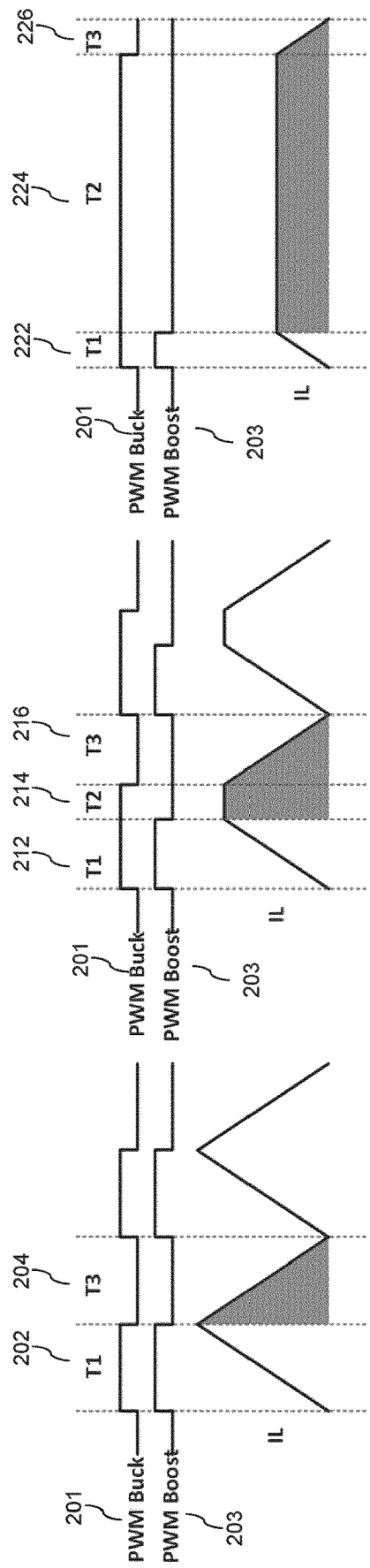
FIG. 2A, 2B, and 2C are example diagrams illustrating typical PWM waveforms including a PWM buck 201 and a PWM boost 203 and the inductor current IL 105 of the buck-boost power converter of FIG. 1.

As set forth above, converter 100 can be configured to operate in either a buck mode, a boost mode, or a buck-boost mode of operation, for example depending on the relative values of the input voltage and the output voltage. FIG. 2A, 2B, and 2C illustrate PWM waveforms during a buck-boost mode of operation, including a PWM buck signal 201 and a PWM boost signal 203 and inductor current IL 105 of the buck-boost power converter of FIG. 1. In the descriptions below, the PWM buck signal 201 being "on" refers to a condition when the controller causes the transistor Q1 to be turned on while transistor Q2 is turned off. Conversely, the PWM buck signal 201 being "off" refers to a condition when the controller causes the transistor Q1 to be turned off while transistor Q2 is turned on. Likewise, the PWM boost signal 203 being "on" refers to a condition when the controller causes the transistor Q4 to be turned on while transistor Q3 is turned off. Conversely, the PWM boost signal 203 being "off" refers to a condition when the controller causes the transistor Q4 to be turned off while transistor Q3 is turned on.

FIGS. 2A, 2B, 2C illustrate different examples of how a controller can switch between switching states T1, T2, and T3 during a buck-boost mode of operation, and the resulting inductor current IL 105 in each state. As can be seen from the figures, the state T1 is when both PWM boost and PWM buck are on. The state T2 is when PWM buck is on and PWM boost is off. The state T3 is when PWM buck is off and PWM boost is on.

In the example of FIG. 2A, the controller merely switches between the states T1 and T3 on each PWM cycle. FIG. 2B illustrates one example of switching between all three of the states T1, T2, and T3 during each PWM cycle. FIG. 2C illustrates another example of switching between all three of the states T1, T2, and T3 during each PWM cycle, albeit with a relatively longer duration of the T2 state as compared to the example of FIG. 2B.

Further, as illustrated in the example of FIG. 2A, during the state T1 202, the inductor current IL 105 increases and during the state T3 204 the inductor current IL 105 decreases. The load 122 is coupled to the inductor during the state T3 204. In the example of FIG. 2B, during the state T1 202, the inductor current IL 105 increases. The inductor current IL 105 may be substantially constant during the state T2 206 and decreases during the state T3 204. The load 124 is coupled to the inductor during the states T2 206 and T3 204. In the example of FIG. 2C, during the state T1 202, the inductor current IL 105 increases. The inductor current IL 105 may be substantially constant during the state T2 206 and decreases during the state T3 204. The load 124 is coupled to the inductor during the states T2 206 and T3 204.

As can be appreciated, a lower average current and lower ripple in the current results in a higher efficiency. Accordingly, in the example of FIG. 2A, switching frequency is well controlled but efficiency may be relatively low. In the example of FIG. 2B, frequency can be well controlled and efficiency can be improved. In the example of FIG. 2C, frequency may not be well controlled but efficiency is further improved.

As set forth above, a controller such as PWM controller 112 can monitor conditions such as input and output voltage values, and cause the converter to operate in either a buck, a boost or a buck-boost mode of operation based on the monitored conditions. For example, when the converter is operating in a buck-boost mode of operation (where the input and output voltages are relatively the same), but then the input voltage rises above a threshold value above the target output voltage, the controller 112 can perform a mode transition from the buck-boost mode to the buck mode.

In each mode and through the mode transitions, it is crucial to select a particular regulation loop at appropriate times depending on the parameter to be regulated and also accommodate for a good transient response. The criteria for selecting any particular regulation loop should depend on the parameter to be regulated by that loop and there should be minimum interdependence among all the regulation loops.

Figure 3:
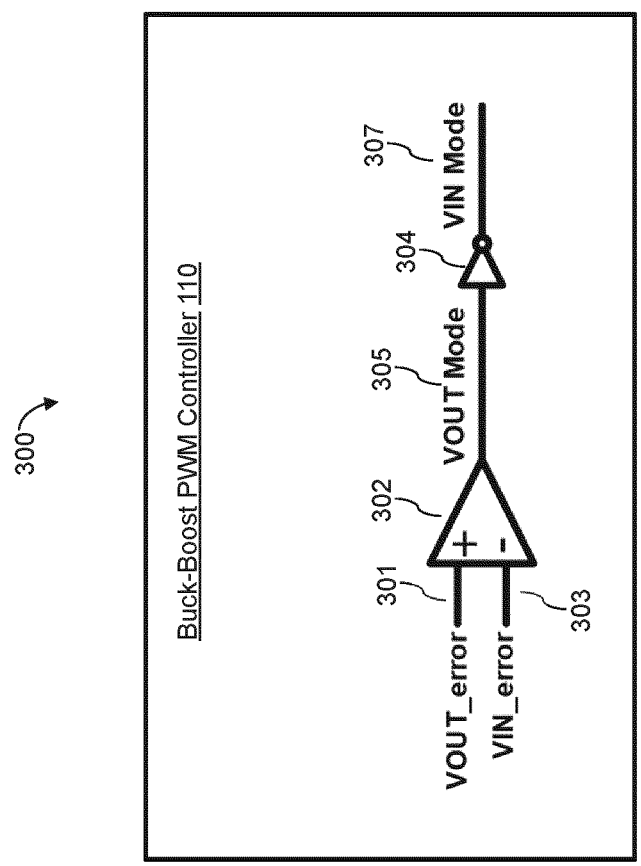
FIG. 3 is a diagram illustrating an example of an existing regulation loop control circuit typically included in the buck-boost power converter of FIG. 1.

FIG. 3 is a diagram illustrating an example of an existing regulation loop control circuit typically included in the buck-boost power converter of FIG. 1. More particularly, the circuit of FIG. 3 can be used to select between the input voltage regulation loop comprising the input voltage sense signal 116 and the output voltage regulation loop comprising the output voltage sense signal 126.

The circuit of FIG. 3 includes a comparator 302 which coupled to receive an output voltage error Vout_error 301 and Vin_error 303. The comparator 302 is coupled to output a signal Vout mode 305 which is inverted by an inverter 304 to generate a Vin mode signal 307. The Vout mode signal 305 may be used to select or enable output voltage loop using some additional circuitry (not shown) such as an error amplifier and an internal voltage reference. Similarly, the Vin mode signal 307 may be used to select or enable the input voltage loop using some additional circuitry (not shown) such as another error amplifier and another internal voltage reference.

Initially it may be assumed that the Vout error 301 is higher than the Vin error 303 and the Vout mode signal 305 is high and as such the output voltage loop is enabled or active or selected or in control via the Vout mode signal 305. At this point the Vin mode signal 307 is low, therefore, the input voltage loop is not selected. It may be noted that in case of the FIG. 3, if the Vout error 301 becomes lower than the Vin error 303, then the Vout_mode signal 305 will be low and the Vin mode signal 307 will become high and the input voltage loop will be enabled or selected. However, in one possible scenario, if Vout error 301 has reduced because of Vout 103 falling suddenly due to a load transient and if the Vin 101 is much higher than the internal voltage reference (not shown), then the input voltage loop will still be enabled. This is not desirable.

Among other things, the present Applicant has discovered that problems can occur if the any regulation loop is selected too early or too late and/or if the regulation loops are interdependent. In particular, it has been discovered that if the input voltage loop is selected too early due to its interdependence on the output voltage loop, when the sensed input voltage is well above its reference, then the converter can suffer from a poor transient response. Meanwhile, the present Applicant has discovered that in configurations including regulation loop control circuits, such interdependencies can be reduced by ensuring that before selecting any regulation loop for a desired parameter, comparing the value of the desired parameter with its reference value.

Figure 4:
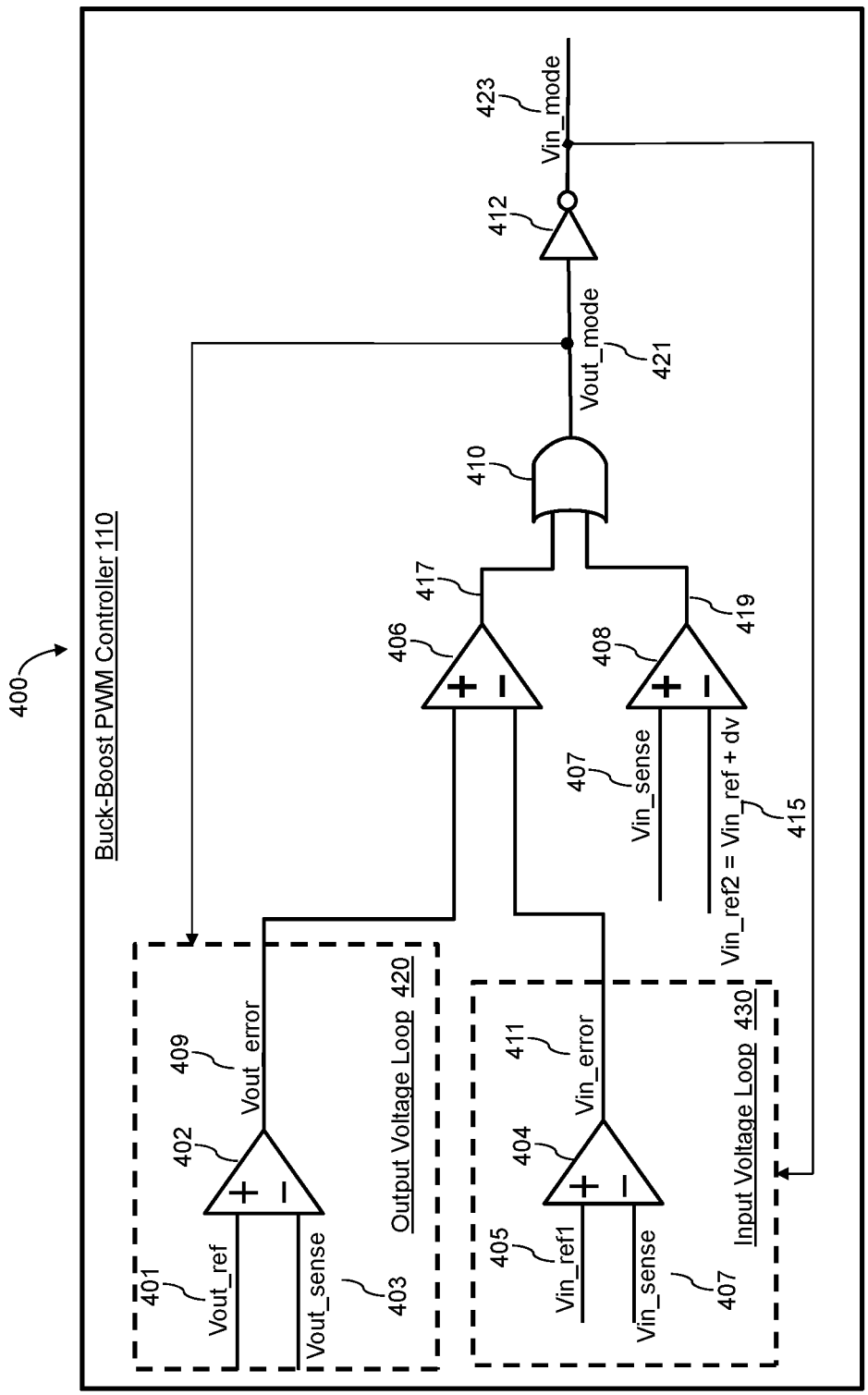
FIG. 4 is a diagram illustrating an example of a regulation loop control circuit which can be included in the buck-boost power converter of FIG. 1, according to an embodiment of the present disclosure.

FIG. 4 is a diagram illustrating an example of a regulation loop control circuit which can be included in the buck-boost power converter of FIG. 1, according to an embodiment of the present disclosure. It should be noted that controller 110 can include many other components, such as components for generating PWM signals for controlling the switching transistors. However, such additional components are not show for clarity of the present disclosure.

The circuit of FIG. 4 includes an output voltage loop 420 comprising an output error amplifier 402, an input voltage loop 430 comprising an input error amplifier 404, an error comparator 406, another comparator, also referred to as a threshold detector 408, an OR gate 410, and an inverter 412. As can be seen, the output error amplifier 402 is coupled to receive an output reference voltage Vout_ref 401 and a sensed output voltage Vout_sense 403, and coupled to generate an output voltage error signal 409, also referred to as an output voltage error 409. The input error amplifier 404 is coupled to receive an input reference voltage Vin_ref1 405 and a sensed input voltage Vin_sense 407, and coupled to generate an input voltage error signal 411, also referred to as an input voltage error 411. As can be appreciated the output voltage error 409 is proportional to a difference between the Vout_ref signal 401 and the Vout_sense 411. As can be appreciated the input voltage error 411 is proportional to a difference between the Vin_ref1 signal 405 and the Vin_sense 407. The output of the OR gate is a Vout_mode signal 421, also referred to as an output voltage loop mode signal, and may be used to enable or disable the output voltage loop 420 as shown. The output of the inverter is the Vin_mode signal 423, also referred to as an input voltage loop mode signal, and may be used to enable the input voltage 430 as shown.

The error comparator 406 is configured to compare the signals Vout_error 409 and Vin_error 411 and generate an error comparison signal 417. The comparator 408 is also coupled to receive the Vin_sense signal 407 and an input loop voltage threshold reference signal Vin_ref2 415. In one example, Vin_ref2 415 is only slightly higher than the input voltage reference signal Vin_ref1 405, with a value equal to Vin_ref1+dv, wherein dv can be a very small amount.

In one example, the amount of dv may be equal to 0.5 to 2.5 percent of the Vin_ref1. It may be appreciated by those skilled in the art that the value of dv may have to be clearly distinguishable from the tolerance of the overall circuit.

The output of the comparator (threshold detector) 408 may be referred to as an input voltage loop threshold signal 419 as it becomes active at the threshold set by the Vin_ref2 415. The OR gate 410 is coupled to receive both the error comparison signal 417 and the input voltage loop threshold signal 419. As can be appreciated by those skilled in the art, if the Vout_error 409 is lower than the Vin_error 411, then the error comparison signal 417 will be low or else it will be high. If the Vin_sense 407 is only a little higher than the Vin_ref2 415 then the signal 419 will be high or else it will be low. Thus, if the Vout_error is lower than the Vin_error 411, but if the Vin_sense 407 is higher than the Vin_ref2, then the signal 419 will be high, making the output Vout_mode 421 of the OR gate 410 high. That will make the Vin_mode 423 low and the input voltage loop may not be enabled yet. Therefore, in the case of a heavy load transient, if the Vout error 409 becomes lower than the Vin_error 411, the Vout_mode 421 may still keep the output voltage loop in control.

Further, in this scenario, if the sensed input voltage Vin_sense 407 becomes slightly lower than the Vin_ref2, then the output 419 of the comparator 408 may become low, making the output of the OR gate low. In this case, the output voltage loop may be disabled via the low Vout_mode 421 and the input voltage loop may be enabled because of the inverter 412 via the high Vin_mode signal 423. Since Vin_ref2 415 is slightly higher than the input voltage reference Vin_ref1 405, it may be appreciated that in this example embodiment, the input voltage loop may be enabled when the sensed input voltage is substantially equal to the input reference voltage. In other words, in one example, the disclosed circuit is configured to enable the input voltage loop 430 when the input voltage error is substantially zero. Similarly it may be appreciated that in one example, the disclosed circuit is configured to enable the output voltage loop 420 when the output voltage error is higher than the input voltage error; or when the output voltage error is lower than the input voltage error and the input voltage error is substantially non-zero.

Figure 5:
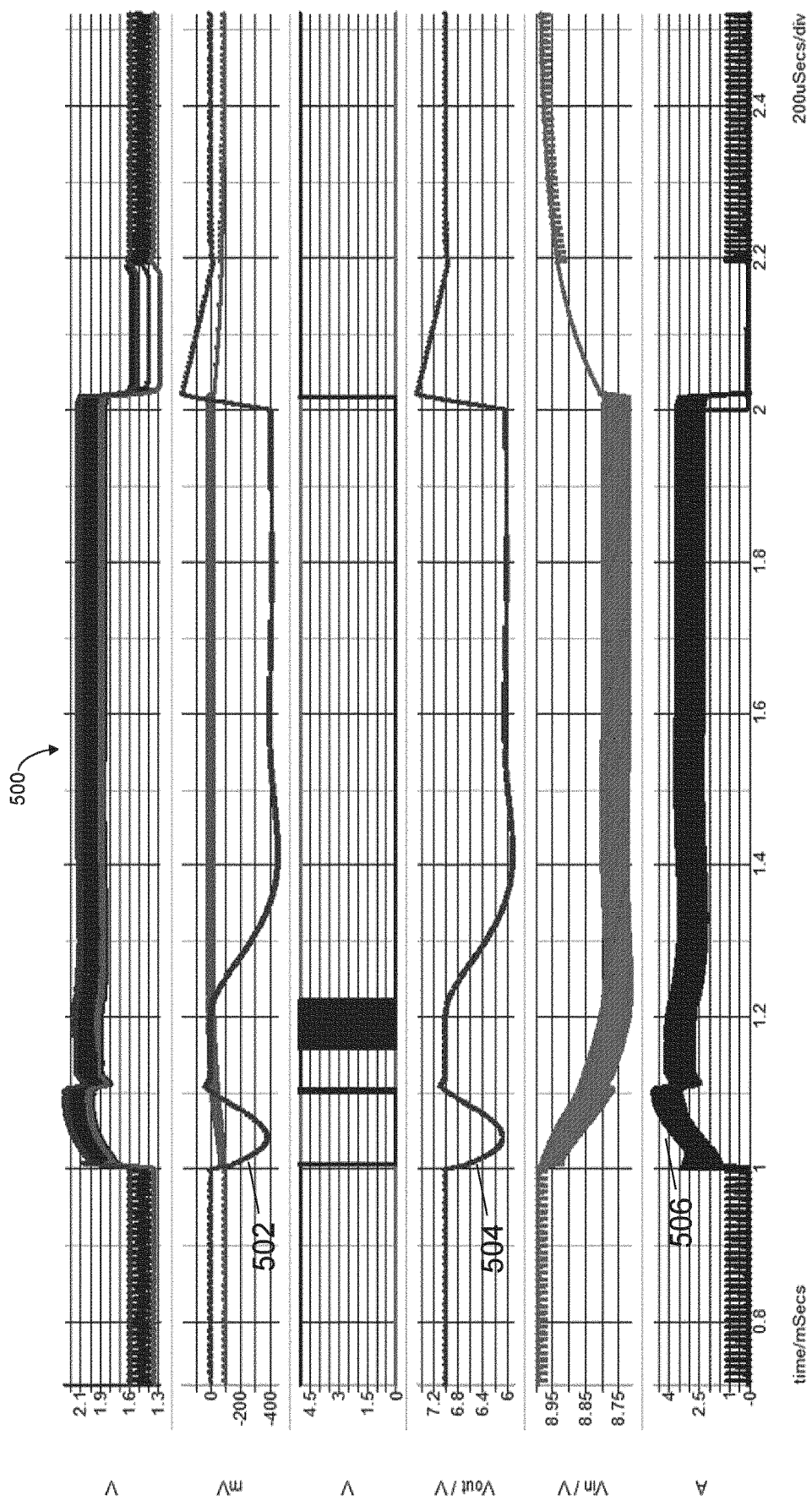
FIG. 5 is a diagram providing example waveforms associated with a buck-boost converter including conventional loop control circuitry.

FIG. 5 illustrates various example waveforms associated with a buck-boost converter including conventional loop control circuitry. As shown by waveform 502, during a load step (waveform 506), when VOUT error drops below VIN error, the input voltage regulation loop takes control too early. As further shown by waveform 504, this causes VOUT to drop significantly.

Figure 6:
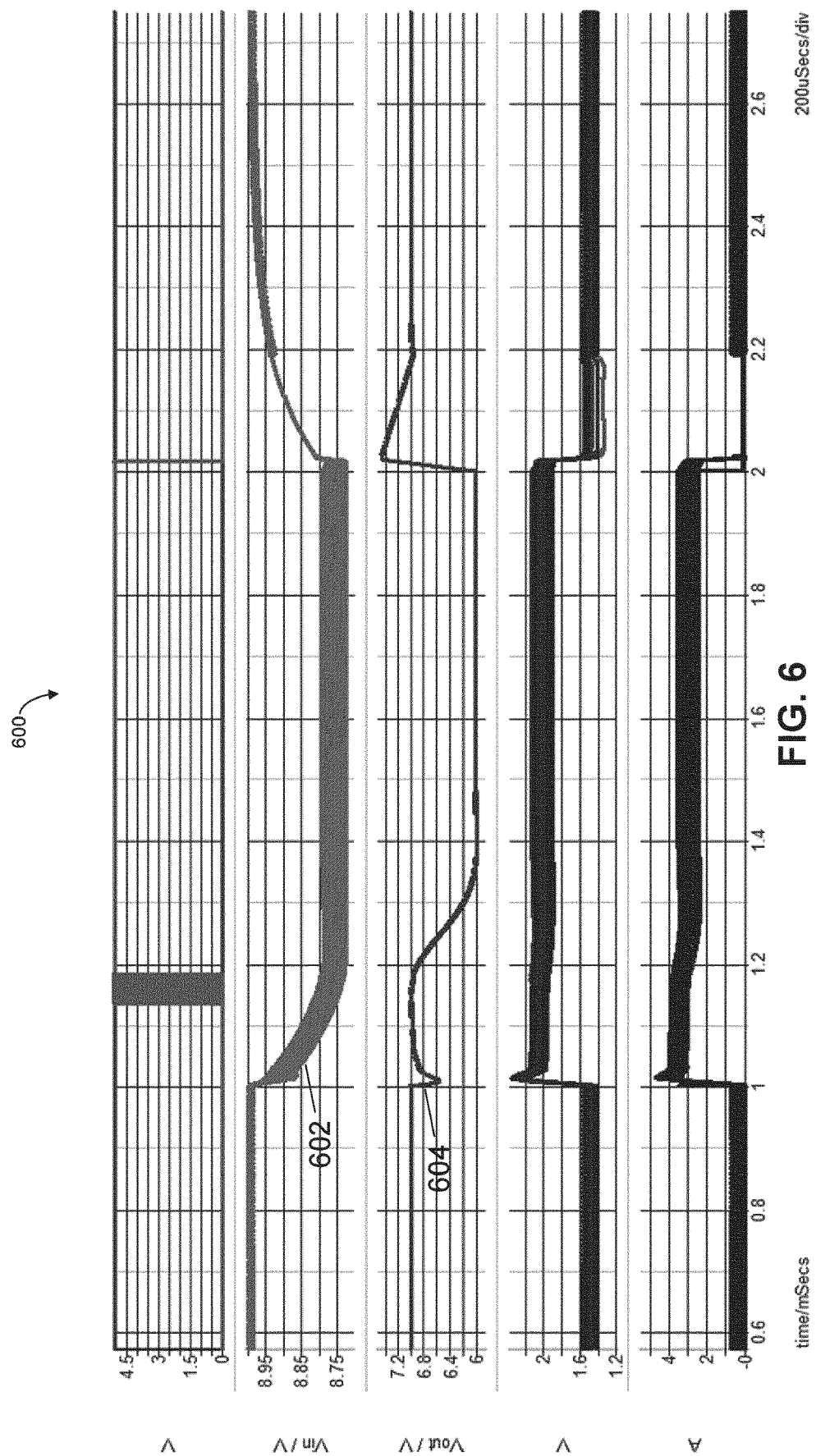
FIG. 6 is a diagram providing example waveforms associated with a buck-boost converter including loop control circuitry according to an embodiment of the present disclosure.

FIG. 6 illustrates various example waveforms associated with a buck-boost converter including the loop control circuitry according to an embodiment of the present disclosure. As shown by waveform 602, during a load step, the VIN loop control is delayed. As further shown by waveform 604, this causes the VOUT response to be much better than the conventional approach shown in FIG. 5.

Figure 7:
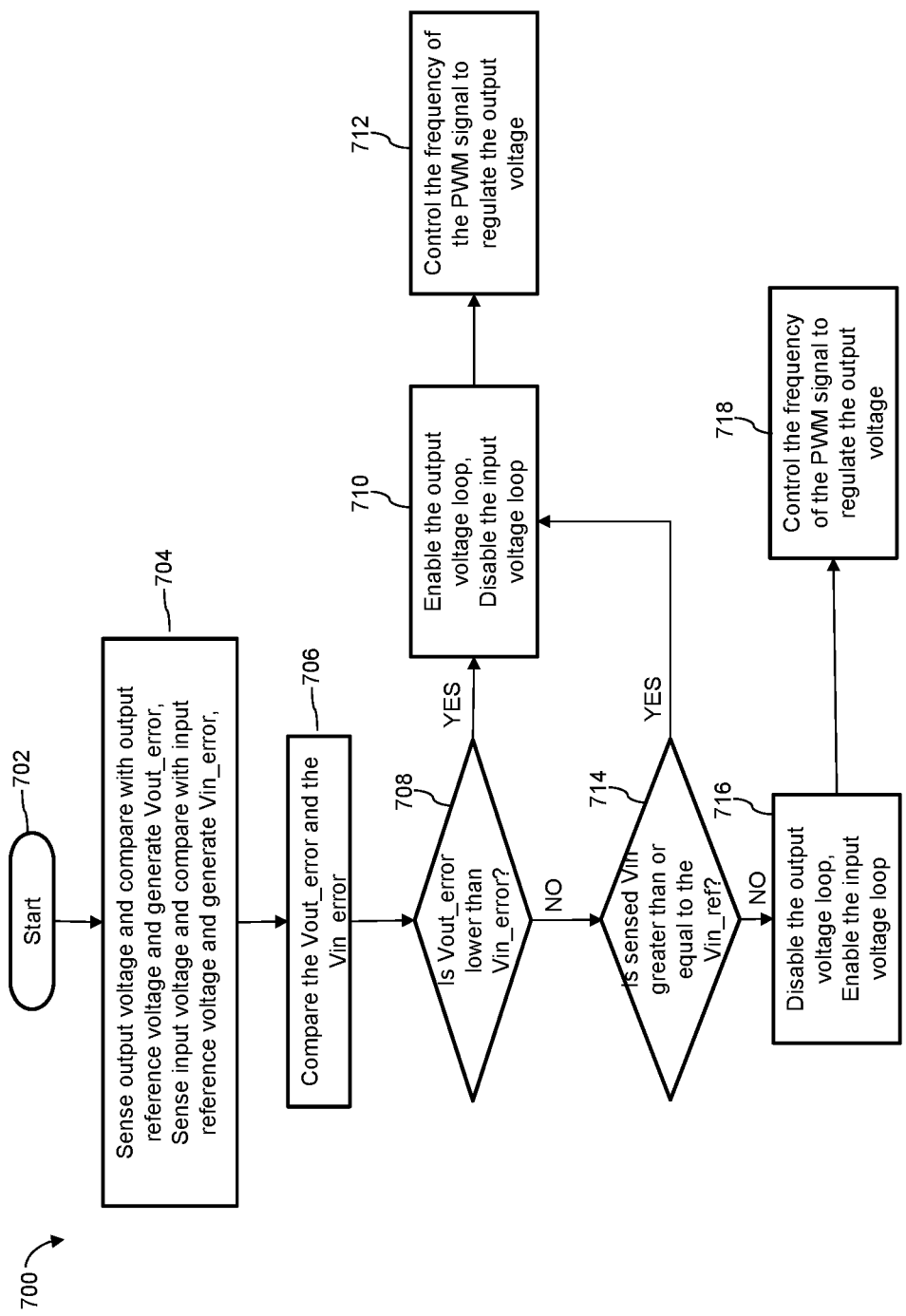
FIG. 7 illustrates an example flow diagram of implementation of a methodology for operating a loop control circuit according to an embodiment of the present disclosure.

FIG. 7 illustrates an example flow diagram of implementation of the regulation loop control circuit of FIG. 4, according to an embodiment of the present disclosure. More particularly, FIG. 7 illustrates an example flow diagram 700 of an implementation of the regulation loop control circuit of FIG. 4 to be included in the converter 100 of FIG. 1, according to an embodiment of the present disclosure. The flow diagram 700 illustrates an example method for the buck-boost PWM controller 112 to select the input voltage loop when the Vin_sense 407 is substantially equal to the input reference voltage Vin_ref1.

As can be seen, after starting at block 702, the method proceeds to block 704. At block 704, the output voltage may be sensed and compared with the output reference voltage, and a Vout_error may be generated. Similarly, the input voltage may be sensed and compared with the input reference voltage, and a Vin_error may be generated. Referring back to FIG. 4, this block relates to the implementation of the error amplifiers 402 and 404. The method may then proceed to block 706.

At block 706, the Vout_error and the Vin_error may be compared. Referring back to FIG. 4, this block relates to the implementation of the error comparator 406. The method may then proceed to block 708.

At block 708, it may be checked if the Vour_error is lower than the Vin_error. If so, then the method may proceed to block 710. If not, then the method may proceed to block 714.

At block 710, the output voltage loop may be enabled and the input voltage loop may be disabled. Referring back to FIG. 4, this relates to the signal Vout_mode 421 being high and Vin_mode 423 being low. The method may then proceed to block 712.

At block 712, the output voltage may be regulated by controlling the frequency and/or pulse width of the PWM signal.

At block 714, it may be checked if the sensed input voltage is greater than or equal to the Vin_ref. If so, then the method may proceed to the block 710 where the output voltage loop is enabled and the input voltage loop is disabled. If not, then the method may proceed to block 716.

At block 716, the output voltage loop is disabled and the input voltage loop is enabled. Referring back to FIG. 4, this relates to the Vout_mode signal 421 being low and the Vin_mode signal 423 being high. The method may then proceed to block 718.

At block 718, the input voltage may be regulated by controlling the frequency and/or pulse width of the PWM signal.

In the above specification, the terms "power converter" and "power supply" may be used interchangeably to mean the same thing. The terms "coupled to", "configured to", "operable to" may be used interchangeably to mean the same thing.

In the above specification, the terms "reference voltage control circuit" and "reference voltage modifier circuit" may be used interchangeably to mean the same thing. The terms "coupled to", "configured to", "operable to" may be used interchangeably to mean the same thing.

In the above specification, some common electronic circuits such as flip-flops or other digital circuits may be clocked by on-chip oscillators derived from phase locked loops (plls), crystal oscillators or any other conventional methods of generating a clock. In other embodiments, the clocks could be external as well.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A regulation loop control circuit for a power converter comprising an inductor and a plurality of transistors coupled to the inductor, the power converter coupled to receive an input voltage and an input current and coupled to provide an output voltage and an output current, the circuit configured to:
- generate an output voltage loop mode signal based on an error comparison signal and an input voltage loop threshold signal;
- generate an input voltage loop mode signal based on the output voltage loop mode signal;
- select an output voltage regulation loop according to the output voltage loop mode signal and in response to one or more of an output voltage error being higher than an input voltage error and a non-zero input voltage error, the error comparison signal being based on the output voltage error; and
- select an input voltage regulation loop according to the input voltage loop mode signal and in response to the output voltage error being lower than the input voltage error and a substantially zero input voltage error.

2. The circuit according to claim 1 wherein:
- the output voltage error is generated by an output voltage error amplifier coupled to receive a sensed output voltage and an output reference voltage and wherein the output voltage error is proportional to a difference between the two, and
- the input voltage error is generated by an input voltage error amplifier coupled to receive a sensed input voltage and an input reference voltage and wherein the input voltage error is proportional to a difference between the two.

3. The circuit according to claim 2, comprising:
- a first comparator coupled to compare the output voltage error and the input voltage error and generate the error comparison signal,
- wherein the error comparison signal is logic high if the output voltage error is higher than the input voltage error, and
- wherein the error comparison signal is logic low if the output voltage error is lower than the input voltage error.

4. The circuit according to claim 3, further comprising:
- a second comparator coupled to compare the sensed input voltage and an input loop threshold reference signal, generate the input voltage loop threshold signal having a low level if the sensed input voltage is lower than an input loop threshold voltage, and generate the input voltage loop threshold signal having a high level if the sensed input voltage is higher than the input loop threshold voltage.

5. The circuit according to claim 4, wherein, the input loop voltage threshold reference signal is higher than the input reference voltage by a 0.5 to 2.5 percent.

6. The circuit according to claim 5, further comprising:
- a logic OR gate coupled to receive the error comparison signal and the input voltage loop threshold signal and provide an output voltage loop mode signal, and
- an inverter coupled to receive the output voltage loop mode signal and generate an input voltage loop mode signal.

7. The circuit according to claim 6, wherein the circuit is further configured to:
- enable the output voltage loop mode signal; and
- regulate the output voltage in response to the enabled output voltage loop mode signal.

8. The circuit according to claim 6, wherein the circuit is further configured to:
- enable the input voltage loop mode signal; and
- regulate the input voltage in response to the enabled input voltage loop mode signal.

9. A method for selecting a regulation loop for a power converter comprising an inductor and a plurality of transistors coupled to the inductor, the power converter coupled to receive an input voltage and an input current and coupled to provide an output voltage and an output current, the method comprising:
- generating an output voltage loop mode signal based on an error comparison signal and an input voltage loop threshold signal;
- generating an input voltage loop mode signal based on the output voltage loop mode signal;
- selecting an output voltage regulation loop according to the output voltage loop mode signal and in response to one or more of an output voltage error being higher than an input voltage error and a non-zero input voltage error, the error comparison signal being based on the output voltage error; and
- selecting an input voltage regulation loop according to the input voltage loop mode signal and in response to the output voltage error being lower than the input voltage error and a substantially zero input voltage error.

10. The method according to claim 9 further comprising:
- generating the output voltage error by an output voltage error amplifier coupled to receive a sensed output voltage and an output reference voltage and wherein the output voltage error is proportional to a difference between the two, and
- generating the input voltage error by an input voltage error amplifier coupled to receive a sensed input voltage and an input reference voltage and wherein the input voltage error is proportional to a difference between the two.

11. The method according to claim 10 further comprising:
- comparing by a first comparator the output voltage error and the input voltage error and generating the error comparison signal,
- wherein the error comparison signal is logic high if the output voltage error is higher than the input voltage error, and
- wherein the error comparison signal is logic low if the output voltage error is lower than the input voltage error.

12. The method according to claim 11 further comprising:
- comparing by a second comparator the sensed input voltage and an input loop threshold reference signal,
- generating the input voltage loop threshold signal having a low level if the sensed input voltage is lower than an input loop threshold voltage; and
- generating the input voltage loop threshold signal having a high level if the sensed input voltage is higher than the input loop threshold voltage.

13. The method according to claim 12 wherein: input voltage loop threshold voltage is higher than the input reference voltage by a 0.5 to 2.5 percent.

14. The method according to claim 13, further comprising:
- receiving the error comparison signal and the input voltage loop threshold signal by a logic OR gate and generating an output voltage loop mode signal by the logic OR gate,
- receiving the output voltage loop mode signal by an inverter, and generating an input voltage loop mode signal by the inverter.

15. The method according to claim 14, further comprising:
   enabling the output voltage loop mode signal; and
   regulating the output voltage in response to the enabled output voltage loop mode signal signal.

16. The method according to claim 15, further comprising:
   enabling the input voltage loop mode signal; and
   regulating the input voltage in response to the enabled input voltage loop mode signal signal.

17. A method for selecting a regulation loop for a power converter comprising an inductor and a plurality of transistors coupled to the inductor, the power converter coupled to receive an input voltage and an input current and coupled to provide an output voltage and an output current, the method comprising:
   comparing a sensed input voltage and an input loop voltage threshold reference signal;
   generating an input voltage loop threshold signal having a low level if the sensed input voltage is lower than an input loop threshold voltage; and
   generating the input voltage loop threshold signal having a high level if the sensed input voltage is higher than the input loop threshold voltage;
   generating an output voltage loop mode signal based on an error comparison signal and the input voltage loop threshold signal, and by a logic OR gate;
   generating an input voltage loop mode-signal based on the output voltage loop mode signal;
   selecting an output voltage regulation loop according to the output voltage loop mode signal and in response to one or more of an output voltage error being higher than an input voltage error and a non-zero input voltage error, the error comparison signal being based on the output voltage error; and
   selecting an input voltage regulation loop according to the input voltage loop mode signal and in response to the output voltage error being lower than the input voltage error and a substantially zero input voltage error.

\* \* \* \* \*